US011272602B2

United States Patent
Pandharipande (10) Patent No.: US 11,272,602 B2
(45) Date of Patent: Mar. 8, 2022

(54) LIGHTING CONTROL METHOD FOR EXCESS ELECTRICAL POWER ACCOUNTING

(71) Applicant: SIGNIFY HOLDING B.V., Eindhoven (NL)

(72) Inventor: Ashish Vijay Pandharipande, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/284,992

(22) PCT Filed: Oct. 18, 2019

(86) PCT No.: PCT/EP2019/078389
§ 371 (c)(1),
(2) Date: Apr. 13, 2021

(87) PCT Pub. No.: WO2020/083779
PCT Pub. Date: Apr. 30, 2020

(65) Prior Publication Data
US 2021/0352793 A1    Nov. 11, 2021

(30) Foreign Application Priority Data

Oct. 23, 2018 (EP) ........................ 8201957

(51) Int. Cl.
*H05B 47/14* (2020.01)
*H05B 47/155* (2020.01)

(52) U.S. Cl.
CPC ........... *H05B 47/155* (2020.01); *H05B 47/14* (2020.01)

(58) Field of Classification Search
None
See application file for complete search history.

(56) References Cited

U.S. PATENT DOCUMENTS

2007/0282547 A1* 12/2007 Howell ................. G01R 22/10
702/60
2016/0025782 A1    1/2016 Bogdanovich
(Continued)

FOREIGN PATENT DOCUMENTS

JP    2004518259 A    6/2004
JP    2013037766 A    2/2013
(Continued)

*Primary Examiner* — Dedei K Hammond (57) ABSTRACT

The invention provides a control system (1000) comprising an electrical power control system (100) for monitoring electrical power consumption by a target system (200), wherein: —the target system (200) comprises (i) one or more dimmable electronic devices (210), wherein each dimmable electronic device (210) comprises a lighting device (220), wherein the one or more dimmable electronic devices (210) are operable at a plurality of different dimming conditions thereby defining a dimming range of the one or more dimmable electronic devices (210) with a predetermined relation between the plurality of different dimming conditions and an electrical power consumption by the one or more dimmable electronic devices (210), (ii) a target control system (230) configured to control the dimming conditions of the one or more dimmable electronic devices (210), and (iii) a source of electrical power (240) configured to provide electrical power to the one or more dimmable electronic devices (210); —the electrical power control system (100) is configured to execute an electrical power control operation comprising (i) bringing the one or more dimmable electronic devices (210) consecutively at N different dimming conditions, wherein N is at least 2, (ii) sensing the respective electrical power consumptions during the N different dimming conditions, and (iii) determining in a determination stage whether or not a further electronic device (10) having deviating dimming behavior or having no dimming functionality is functionally coupled to the source (Continued)

of electrical power (240) based on a comparison of the sensed electrical power consumptions and the predetermined relation between the plurality of different dimming conditions and the electrical power consumption.

15 Claims, 3 Drawing Sheets

(56) References Cited

U.S. PATENT DOCUMENTS

| | | |
|---|---|---|
| 2016/0113096 A1 | 4/2016 | Wagner et al. |
| 2018/0139809 A1* | 5/2018 | Pandharipande .... H05B 47/175 |

FOREIGN PATENT DOCUMENTS

| | | |
|---|---|---|
| WO | 2012137092 A1 | 10/2012 |
| WO | 2013144756 A2 | 10/2013 |

* cited by examiner

LIGHTING CONTROL METHOD FOR EXCESS ELECTRICAL POWER ACCOUNTING

CROSS-REFERENCE TO PRIOR APPLICATIONS

This application is the U.S. National Phase application under 35 U.S.C. § 371 of International Application No. PCT/EP2019/078389, filed on Oct. 18, 2019, which claims the benefit of European Patent Application No. 18201957.0, filed on Oct. 23, 2018. These applications are hereby incorporated by reference herein.

FIELD OF THE INVENTION

The invention relates to a lighting system comprising a control system as well as to a method for monitoring electrical power consumption by a system.

BACKGROUND OF THE INVENTION

Lighting control systems are known in the art. US2016/0113096, for instance, describes lighting control devices, network systems, and methodologies, including methods for providing closed-loop dimming control of such systems. In some examples, described methods and device configurations may include an intelligent photo control configured to accept target dimmed fixture wattage value commands from a user, and provide closed-loop control at the fixture to achieve that target wattage via real-time adjustment of the 0-10V dimming control signal sent to the LED driver. As such, the need for trial-and-error adjustments of the 0-10V analog control voltage, or derivation of dim voltage to fixture wattage response curves in order to achieve a desired fixture wattage level, may be reduced or eliminated.

WO2012/137092 A1 discloses controlling power consumption of at least one group of plurality of groups of lighting devices, each group comprising change range indicating values, by which energy consumption of the respective group can be changed. To this, for each of the at least one group a corresponding target power consumption change value is determined, by which power consumption of the corresponding group has to be changed, by selecting for each group of the plurality of groups a corresponding target power consumption change value from the corresponding change range of the corresponding group such that normalized illumination change values of the plurality of groups have minimal difference among each other, each of the normalized illumination change values being determined for corresponding group by use of the selected target power consumption change value of the group.

WO2013/144756 A2 discloses an apparatus for operating a plurality of lighting units of a lighting network according to energy demand and/or energy supply. Demand response of a smart grid is proactively managed based on time intervals and/or the zone of the lighting units of the lighting network. The security of one or more transmissions in the lighting network may be dependent on the importance of a transmitted demand response signal.

US2016/025782 A1 discloses an apparatus for performing an energy audit, using one or more current sensors clamped to an existing lighting system to measure one or more current or voltage signals over a first period of time; calculating a first power usage from the one or more current or voltage signals; replacing the existing lighting system with a replacement lighting system; using the one or more current sensors to measure one or more current or voltage signals of the replacement lighting system over a second period of time; calculating a second power usage from the one or more current or voltage signals; determining a power difference between the first power usage and the second power usage; using the power difference to estimate a cost savings between the first period of time and the second period of time; and generating an energy audit report.

SUMMARY OF THE INVENTION

Street lighting energy consumption is a significant part of infrastructure energy use and a significant cost element in municipality budgets. Energy savings from a LED lighting upgrade is an important driver for upgrading from traditional lighting to LED lighting. Monitoring energy consumption for deviations becomes important to ensure that the promised energy savings are delivered over the lighting system lifecycle. Such deviations may occur due to extraneous factors, like someone connecting an external electrical load (either illegitimately or legitimately) to a street cabinet of an outdoor street lighting system. Detecting such excess energy consumption and properly accounting for it, for instance in energy savings, may thus be desirable. For instance, legitimate electric connections to the lighting system can be properly accounted to the appropriate consumer and suitably charged based on energy usage.

A method to detect any excess energy consumption could be to apply an outlier detection method to determine loads beyond a known installed load. The value of the installed lighting load is collected from a system audit phase. However, a practical problem for larger-scale lighting systems is that auditing may not always be done properly leading to incomplete or inaccurate audit data and/or may be relatively expensive. Even if audit is done prior to system installation, (the basis of the) audit information may change over the lighting system lifecycle. As such, it is not straightforward to apply outlier detection due to the difficulty in selection of detection thresholds needed in such methods.

Hence, it is an aspect of the invention to provide an (alternative) method for monitoring electrical power consumption which preferably further at least partly obviates one or more of above-described drawbacks. The present invention may have as object to overcome or ameliorate at least one of the disadvantages of the prior art, or to provide a useful alternative. Likewise, it is an aspect of the invention to provide a computer program product that may execute such method. Further, it is an aspect of the invention to provide a lighting system comprising a target system and a control system, such as a lighting control system, that may be configured to execute such method.

Amongst others, herein a lighting control method and associated processing to detect excess loads that are beyond the lighting load is proposed.

Amongst others, the invention proposes in embodiments a connected lighting system with a controller capable of dimming one or more luminaires, an energy measurement unit capable of measuring energy consumed by the lighting system, a processing unit that processes energy data and outputs excess energy consumption, if applicable. The lighting control system may set the luminaires to at least two dimming levels in a range where the LED luminaire dimming curve is linear, over a duration of the energy measurement period. The lighting control system especially measures the energy consumption corresponding to the set dimming levels. Further, the processing method may use the said energy consumption measurements to estimate excess energy consumption of a load connected beyond the lighting load. Herein, e.g. outdoor street lighting as an example is proposed, although the proposed invention may be applied to other segments where electricity pilferage and excess energy accounting may be relevant. Instead of the term "processing unit" also the term "processor" may be applied. Especially, such processor may be comprised by a control system.

Hence, in a first aspect the invention provides a lighting system comprising a target system and a control system comprising an electrical power control system for monitoring electrical power consumption by a target system, wherein:

the target system comprises (i) one or more dimmable electronic devices, wherein the one or more dimmable electronic devices are operable at a plurality of different dimming conditions thereby defining a dimming range of the one or more dimmable electronic devices with a predetermined relation between the plurality of different dimming conditions and an electrical power consumption by the one or more dimmable electronic devices, (ii) a target control system configured to control the dimming conditions of the one or more dimmable electronic devices, and (iii) a source of electrical power configured to provide electrical power to the one or more dimmable electronic devices;

the electrical power control system is configured to execute an electrical power control operation comprising: sensing the respective electrical power consumptions during N different dimming conditions, wherein N is at least 2; and determining in a determination stage whether or not a further electronic device having deviating dimming behavior, compared to the one or more dimmable electronic devices, or having no dimming functionality is functionally coupled to the source of electrical power based on a comparison of the sensed electrical power consumptions and the predetermined relation between the plurality of different dimming conditions and the electrical power consumption.

Especially, in an aspect the invention provides a lighting system comprising a target system and a control system comprising an electrical power control system for monitoring electrical power consumption by a target system, wherein:

the target system comprises (i) one or more dimmable electronic devices, wherein the one or more dimmable electronic devices are operable at a plurality of different dimming conditions thereby defining a dimming range of the one or more dimmable electronic devices with a predetermined relation between the plurality of different dimming conditions and an electrical power consumption by the one or more dimmable electronic devices, (ii) a target control system configured to control the dimming conditions of the one or more dimmable electronic devices, and (iii) a source of electrical power configured to provide electrical power to the one or more dimmable electronic devices;

the electrical power control system is configured to execute an electrical power control operation comprising (i) bringing the one or more dimmable electronic devices consecutively at N different dimming conditions, wherein N is at least 2, (ii) sensing the respective electrical power consumptions during the N different dimming conditions, and (iii) determining in a determination stage whether or not a further electronic device having deviating dimming behavior or having no dimming functionality is functionally coupled to the source of electrical power based on a comparison of the sensed electrical power consumptions and the predetermined relation between the plurality of different dimming conditions and the electrical power consumption.

With such a lighting system or control system, or with such electrical power control system, even without knowing the specific number the number of dimmable electronic devices, or even in embodiments without knowing the specific dimmable electronic device, it may nevertheless be determined whether or not an alien electronic device is available. Such alien device can be determined as alien device when the alien device is not dimmable or has not a dimmable behavior(s) essentially identical to the one or more dimmable electronic devices comprised by the target system. Hence, a system, a method (see also below), and computer program product (see also below), are provided which allow a reliable outlier detection which can be ascribed to unexpected or unauthorized electrical power consumption from the target system.

As indicated above, the invention provides a lighting system comprising a target system and a control system comprising an electrical power control system for monitoring electrical power consumption by a target system. The term "control system" in the context of the invention wherein is referred to the electrical power control system for monitoring electrical power consumption by a target system refers to a control system at least including the electrical power control system. Hence, in embodiments the invention also provides the electrical power control system per se.

However, in specific embodiments of the lighting system the electrical power control system and the target control system (of the target system) are comprised by the control system. In such embodiments, a control system is provided that may control the target system, or more especially, the dimmable electronic devices comprised by the control target system, as wall allowing execution of the electrical power control operation as further defined herein. Hence, such control system may control the dimmable electronic devices and execute a outlier detection. Hence, in specific embodiments a single control system may have the functionalities of the electrical power control system as well as of the target control system. Therefore, the phrase "the electrical power control system is configured to execute an electrical power control operation comprising (i) bringing the one or more dimmable electronic devices consecutively at N different dimming conditions, wherein N is at least 2" and similar phrases may refer to a separate control system comprised by the electrical power control system, which as a master control system controls the target control system. However, this phrase and similar phrases may also refer to a control system wherein the target system autonomously brings the one or more dimmable electronic devices consecutively at N different dimming conditions, wherein N is at least 2, and wherein the electrical power control system (further) executes (ii) sensing (in sensing stage) the respective electrical power consumptions during the N different dimming conditions, and (iii) determining in a determination stage whether or not a further electronic device having deviating dimming behavior or having no dimming functionality is functionally coupled to the source of electrical power based on a comparison of the sensed electrical power consumptions and the predetermined relation between the plurality of different dimming conditions and the electrical power consumption. Hence, in embodiments the control system may have the functionality of the target control system and the electrical power control system.

Therefore, (effectively) the invention also provides in an aspect a lighting system comprising a target system and a control system comprising an electrical power control system for monitoring electrical power consumption by a target system, wherein:

the target system comprises (i) one or more dimmable electronic devices, wherein the one or more dimmable electronic devices are operable at a plurality of different dimming conditions thereby defining a dimming range of the one or more dimmable electronic devices with a predetermined relation between the plurality of different dimming conditions and an electrical power consumption by the one or more dimmable electronic devices, (ii) a target control system configured to control the dimming conditions of the one or more dimmable electronic devices, wherein the target control system is further configured to bring—in an operation mode—the one or more dimmable electronic devices consecutively at N different dimming conditions, wherein N is at least 2, and (iii) a source of electrical power configured to provide electrical power to the one or more dimmable electronic devices;

the electrical power control system is configured to execute an electrical power control operation comprising (i) sensing the respective electrical power consumptions during the N different dimming conditions, and (ii) determining in a determination stage whether or not a further electronic device having deviating dimming behavior or having no dimming functionality is functionally coupled to the source of electrical power based on a comparison of the sensed electrical power consumptions and the predetermined relation between the plurality of different dimming conditions and the electrical power consumption.

Hence, in specific embodiments the control system as defined herein may be configured (i) to control—in an operation mode—the dimming conditions of the one or more dimmable electronic devices, and (ii) to execute an electrical power control operation (comprising (i) sensing the respective electrical power consumptions during the N different dimming conditions, and (ii) determining in a determination stage whether or not a further electronic device having deviating dimming behavior or having no dimming functionality is functionally coupled to the source of electrical power based on a comparison of the sensed electrical power consumptions and the predetermined relation between the plurality of different dimming conditions and the electrical power consumption).

In other embodiments, the electrical power control system and the target control system are different control systems. However, especially the electrical power control system and the target control system are functionally coupled, such as via a wired connection or a wireless connection.

The one or more dimmable electronic devices may be part of a dimmable electronic device system (like a street lighting system or indoor lighting system). The target control system may be comprised by or may be functionally coupled to such dimmable electronic device system. Likewise, the electrical power control system may be functionally coupled to or be comprised by such dimmable electronic device system. Therefore, in further embodiments, the electrical power control system and the target system may also be comprised by the control system.

The term "controlling" and similar terms especially refer at least to determining the behavior or supervising the running of an element. Hence, herein the term "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

For instance, in embodiments the electrical power control system may be a master control system and the target control system may be a slave control system.

The system, or apparatus, or device may execute an action in a "mode" or "operation mode" or "mode of operation". Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

The electrical power control system may in embodiments especially be designed for monitoring electrical power consumption by a target system. The target system may be suitable to be monitored by the electrical power control system when the target system comprises (i) one or more dimmable electronic devices. Especially, the target system does not comprise non-dimmable electronic devices, except for a possible non-dimmable device for which the target system was not designed.

In general, the target system will include a plurality of dimmable electronic devices.

These devices may in embodiments essentially be identical, such as a plurality of (identical) street poles. Especially, (all) the dimmable electronic devices have a linear relation between the plurality of different dimming conditions and the electrical power consumption, though this is not necessarily the case (as long as the relationships are thus (also) essentially identical).

In yet other embodiments, the dimmable electronic devices may include two or more different (types of) dimmable electronic devices. However, in such embodiments (all) the dimmable electronic devices especially have a linear relation between the plurality of different dimming conditions and the electrical power consumption.

The dimmable electronic device may e.g. be a light source or a source of sound or a source of (other) vibrations. In specific embodiments, the dimmable electronic device may comprise a light source, for instance the light source of a street pole (sometimes also indicated as "street pole").

As indicated above, the dimmable electronic device may especially comprise a lighting device. Hence, the target system may especially be a lighting system. The control system may (thus) in embodiments be a lighting control system. As indicate above, the (lighting) control system may be configured to execute the electrical power control operation and optionally also has the functionality to control the dimming conditions of the one or more dimmable electronic (lighting) devices.

The term "dimmable electronic device" especially refers to an electronic device of which the output, like light, sound, etc., can be controlled, more especially the intensity. Such device may have a predefined maximum output, like a predefined maximum light flux, which may stepwise or stepless be reduced to lower values, which is herein indicated as dimming range. Hence, the term "dimming range" may refer to the total range of achievable intensities up to the predefined maximum output. The dimming range especially includes at least two (significantly) different values larger than zero.

In embodiments wherein the dimmable electronic device has a dimming range, the dimmable electronic device may have a linear relation over the range of possible conditions or may have a linear range between over a part of the possible conditions. Herein, the term linear especially refers to a relation like I=a*P+b, wherein I indicates an intensity parameter, like flux, decibel, etc., and wherein P indicates an electrical power (e.g. in Watt), and wherein b may be zero or non-zero. When e.g. the linear relation is only over part of the total range of achievable intensities up to the predefined maximum output, and e.g. at low powers, there is no linear relation, then b may be unequal to zero.

In embodiments, the intensity parameter may e.g. be selected from the group consisting of "radiant intensity" (a radiometric quantity measured in watts per steradian (W/sr), "luminous intensity" (a photometric quantity measured in lumens per steradian (lm/sr), or candela (cd)), "irradiance" (a radiometric quantity, measured in watts per meter squared (W/m$^2$) or "intensity", the name for irradiance used in other branches of physics (W/m$^2$), "radiance", commonly called "intensity" in astronomy and astrophysics (Wsr$^{-1}$·m$^{-2}$), "luminous flux" or "luminous power", the measure of the perceived power of light in Lumen or cd.sr, or "radiant flux", the radiant energy emitted per unit time in Watts. Other types of (light) intensity parameters may also be applied. In embodiments, the target control system may impose the dimming condition with a feedback control or with a feedforward control.

Therefore, the one or more dimmable electronic devices are operable at a plurality of different dimming conditions, thereby defining a dimming range of the one or more dimmable electronic devices. The one or more electronic devices may especially possess a predetermined relation between the plurality of different dimming conditions and an electrical power consumption (by these one or more dimmable electronic devices).

The target system may further comprise a target control system configured to control the dimming conditions of the one or more dimmable electronic devices. Hence, assuming that the dimmable electronic device is controllable with the intensity I in the range of 0-I$_{max}$, the target control system can define the value of I. The values of I are herein also indicated as "dimming condition".

The target control system can get input from one or more of a user input device, a timer, and a sensor, on the basis of which the target control system can define the (corresponding) intensity value.

The term "target control system" may in embodiments also refer to a master control system controlling a plurality of target slave control systems, with the latter functionally being coupled to a (respective) plurality of sets of dimmable electronic devices. However, as also indicated herein, the target control system may in embodiments be a slave control system of the electrical power control system.

Hence, especially the target control system has the functionality of a controller capable of dimming one or more dimmable electronic devices.

To allow the dimmable electronic device to operate at the desired dimming condition, the target system may also include a source of electrical power configured to provide electrical power to the one or more dimmable electronic devices. The source of electrical power thus especially allows the one or more dimmable electronic devices operate at the dimming conditions.

The term "source of electrical power" may in embodiments also refer to a plurality of sources of electrical power, with the sources of electrical power functionally being coupled to a (respective) plurality of sets of dimmable electronic devices. The source of electrical power may, for example, be a single or a plurality of driver, for example LED driver(s).

Such target system may be addressed by the electrical power control system for monitoring the electrical power consumption (from the source of electrical power.

To evaluate whether there is a further device, not being one of the one or more dimmable electronic devices using electrical power from the source of electrical power, essentially only two different dimming conditions can be chosen and compared to decide whether such further device is available. However, more than two dimming conditions may also be used.

Hence, as indicated above the electrical power control system may in embodiments be configured to execute an electrical power control operation comprising (i) bringing the one or more dimmable electronic devices consecutively at N different dimming conditions, wherein N is at least 2. The number N refers to a natural number larger than 1.

The electrical power control operation can also be seen as a control and monitor operation, as during the control operation the one or more dimmable electronic devices are controlled and the power consumption is monitored.

The electrical power control operation further comprises (ii) sensing (or monitoring) the respective electrical power consumptions (from the source of electrical power) during the N different dimming conditions, and (iii) determining in a determination stage whether or not a further electronic device having deviating dimming behavior or having no dimming functionality is functionally coupled to the source of electrical power. This determination is based on a comparison of the sensed electrical power consumptions and (a predicted power consumption based on) the predetermined relation between the plurality of different dimming conditions and the electrical power consumption. The determination stage may lead to one or more of the following outcomes or equivalents thereof: "further electronic device present" or "further electronic device present". An optional additional outcome may be "deviation from predetermined relation smaller than measurement error", or an equivalent thereof. Hence, especially the determination stage may lead to the outcome whether that a further electronic device having deviating dimming behavior or having no dimming functionality is functionally coupled to the source of electrical power or to the outcome that no further electronic device having deviating dimming behavior or having no dimming functionality is functionally coupled to the source of electrical power.

In specific embodiments, each of the one or more dimmable electronic devices has a linear relation between the plurality of different dimming conditions and the electrical power consumption. The phrase "having a linear relation between the plurality of different dimming conditions and the electrical power" and similar phrases indicated that over at least part of the total range of achievable intensities up to the predefined maximum output, there is a linear relation between the plurality of different dimming conditions and the electrical power. Hence, in embodiments each of the different dimming conditions may relate to respective dimming fractions (or: levels), wherein the dimming fractions are linearly related to the electrical power consumption.

As during switching on or off in a natural way different dimming conditions may be achieved, such stages may especially be used for executing the electrical power control operation. Hence, in embodiments the electrical power control system is configured to execute the electrical power control operation during a switching on phase or during a switching off phase of the target system. Likewise, when the dimming conditions vary with time, such as vary over the day or vary over part of the day, like outdoor lighting may do, periods wherein the dimming conditions increase in level or decrease in level may be used to execute the electrical power control operation.

The monitoring may be essentially a single measuring point, but may in other embodiments also be average over time. This may lead to more reliable results. Therefore, in specific embodiments the electrical power control system may be configured to sense the electrical power consumption during at least one of the N different dimming conditions during a sensing time, and wherein in the determination stage for the respective dimming condition an electrical power consumption averaged over the sensing time is applied. Hence, especially in the determination stage for the respective dimming condition an electrical power consumption averaged over the sensing time may be compared to the predicted power consumption. The phrase "sensing the respective electrical power consumptions during the N different dimming conditions" may thus refer to such sensing during a limited period of time, hence during part of the time the respective dimming condition is imposed or during essentially the entire period the respective dimming condition is imposed.

In embodiments, the length of the sensing time at each dimming condition may be identical. In others, the sensing time at two (or more) dimming conditions may differ. Especially, then, the power consumptions may have to be averaged over the respective sensing times.

As the number (and type) of target system dimmable electronic devices may be known, it may be possible to execute a relatively simple outlier detection. Hence, the control system may e.g. be configured to first execute a simple outlier detection. Hence, in specific embodiments the electrical power control system may be configured to execute a primary electrical power control operation comprising: (i) operating the one or more dimmable electronic devices at a first operation condition (which may be a dimming condition), such as e.g. $I_{max}$, (ii) sensing the electrical power consumption during the first operation condition, and (iii) determining in a primary determination stage whether or not a further electronic device having deviating dimming behavior or having no dimming functionality is functionally coupled to the source of electrical power based on a comparison of the electrical power consumption at the first operation condition with a predetermined relation between the first operation condition and the electrical power consumption.

Would the primary electrical power control operation lead to the result that there is no further electronic device, then the electrical power control operation may not necessarily be executed. However, would the primary electrical power control operation lead to the result that there is a further electronic device, then this determination may either be correct, or may nevertheless be wrong. This determination based on the primary electrical power control operation may be wrong as the number (and/or type of) dimmable electronic devices may have changed since the most recent audit ("system audit phase". Hence, for further certainty, subsequent to the primary electrical power control operation, the electrical power control operation may be executed. Therefore, especially in such embodiments the electrical power control system may (thus) be configured to execute the electrical power control operation only when the primary electrical power control operation resulted in a determination that a further electronic device is functionally coupled to the source of electrical power, wherein an outcome of the subsequent determination in the electrical power control operation overrules an outcome of the determination of the primary electrical power control operation.

As indicated above, in specific embodiments each dimmable electronic device may comprise a lighting device. In embodiments, the dimmable electronic device may be a luminaire or the dimmable electronic device is comprised by a luminaire. Hence, herein the term "lighting device" especially refers to a dimmable lighting device.

In specific embodiments, the target system comprises a street lighting system, wherein each dimmable electronic device comprises a street lighting device. Such street lighting system may comprise a plurality of poles.

In alternative embodiments, the target system comprises an indoor lighting system, wherein each dimmable electronic device comprises an indoor lighting device. Essentially any lighting device may be used as indoor lighting device. The indoor lighting system may be comprised by a hospitality area, such as a restaurant, a hotel, a clinic, or a hospital, etc. The indoor lighting system may also be comprised by (a part of) an office, a department store, a warehouse, a cinema, a church, a theatre, a library, etc.

In embodiments, the control system may comprise the electrical power control system and the target system. When the target system comprises a lighting system, effectively the control system may be a lighting system comprising the electrical power control system. Hence, in yet a further aspect the invention also provides a lighting system comprising the target system and the electrical power control system (for monitoring electrical power consumption by the target system.

The target system may also comprises a plurality of sets of dimmable electronic devices, which may individually be addressed, by a single target control system (or by a plurality of control systems), and which may be powered by a single source of electrical power or by a plurality of (different) sources of electrical power. Each set may (independently) comprise one or more dimmable electronic devices, such as a plurality, like at least 5, such as at least 10, like 5-100,000, such as 5-10,000.

Hence, in specific embodiments the target system may also comprises a plurality of sets of lighting devices, which may individually be addressed, by a single target control system (or by a plurality of control systems), and which may be powered by a single source of electrical power or by a plurality of (different) sources of electrical power. Each set may (independently) comprise one or more dimmable lighting devices, such as a plurality, like at least 5, such as at least 10, like 5-100,000 (for instance 5-100,000 each comprising a lighting device), such as 5-10,000, like 50-2,500, for instance 50-2,500 street poles.

For instance, in embodiments there may be a plurality of streets, or street segments, which are herein indicated as a plurality of sets. The energy control operation may be executed on one or more of the sets of the one or more dimmable electronic devices.

Therefore, in an embodiment the control system may comprise a plurality of sets of the one or more dimmable electronic devices, wherein the electrical power control system is configured to execute the electrical power control operation, wherein the electrical power control operation comprises (i) bringing the one or more dimmable electronic devices of at least one of the plurality of sets consecutively at N different dimming conditions, wherein N is at least 2, (ii) sensing the respective electrical power consumptions during the N different dimming conditions, and (iii) determining in a determination stage whether or not a further electronic device having deviating dimming behavior or having no dimming functionality is functionally coupled to the one or more sources of electrical power based on a comparison of the sensed electrical power consumptions and (a predicted power consumption based on) the predetermined relation between the plurality of different dimming conditions and the electrical power consumption.

Such system may comprise (ii) one or more of the target control systems configured to control the dimming conditions of the one or more dimmable electronic devices of the plurality of sets. Such system may comprise (iii) one or more sources of electrical power configured to provide electrical power to the one or more dimmable electronic devices of the plurality of sets (to allow the one or more dimmable electronic devices operate at the dimming conditions).

In embodiments, the control system may be configured to execute the electrical power control operation regularly, for instance once a month, once a week, once a day, a plurality of times each day, each time when switching on or increasing intensity, each time when switching off or decreasing intensity, etc.

As indicated above, the invention provides in a further aspect a method for monitoring electrical power consumption by a target system, wherein the method comprises executing an electrical power control operation comprising (i) bringing the one or more dimmable electronic devices consecutively at N different dimming conditions, wherein N is at least 2, (ii) sensing the respective electrical power consumptions during the N different dimming conditions, and (iii) determining in a determination stage whether or not a further electronic device having deviating dimming behavior or having no dimming functionality is functionally coupled to the source of electrical power based on the predetermined relation between the plurality of different dimming conditions and the electrical power consumption.

As indicated above, wherein the target system (on which such method may be executed) may especially comprise (i) one or more dimmable electronic devices, wherein each dimmable electronic device comprises a lighting device, wherein the one or more dimmable electronic devices are operable at a plurality of different dimming conditions thereby defining a dimming range of the one or more dimmable electronic devices with a predetermined relation between the plurality of different dimming conditions and an electrical power consumption by the one or more dimmable electronic devices, (ii) a target control system configured to control the dimming conditions of the one or more dimmable electronic devices, and (iii) a source of electrical power configured to provide electrical power to the one or more dimmable electronic devices (to allow the one or more dimmable electronic devices operate at the dimming conditions). Hence, amongst others the invention provides a (lighting) control method for excess electrical power accounting.

As indicated above, the phrase "(i) bringing the one or more dimmable electronic devices consecutively at N different dimming conditions, wherein N is at least 2" and similar phrases may refer to embodiments wherein the target control system autonomously brings the one or more dimmable electronic devices consecutively at N different dimming conditions, wherein N is at least 2, and thereby the sensing (stage) and determination stage may be executed (by the electrical power control system). However, this phrase and similar phrases may also refer to embodiments wherein the electrical power control system brings the one or more dimmable electronic devices consecutively at N different dimming conditions, wherein N is at least 2, and overrules the target control system, such as the electrical power control system being the master control system and the target control system being a slave control system thereof. As also indicated above, the control system may comprise in embodiments both the target control system and the electrical power control system, whereby the control system comprises both functionalities.

In a further embodiment of the method, the method may further comprise executing the electrical power control operation during a switching on phase or during a switching off phase of the target system. Also, in yet a further embodiment the method may (further) comprise sensing (or "monitoring") the electrical power consumption during at least one of the N different dimming conditions during a sensing time, and wherein in the determination stage for the respective dimming condition an electrical power consumption averaged over the sensing time is applied.

In further embodiments of the method the electrical power control operation may be executed regularly, for instance once a month, once a week, once a day, a plurality of times each day, each time when switching on or increasing intensity, each time when switching off or decreasing intensity, etc.

Essentially any embodiment described above in relation to the control system may also apply to the herein described method.

In yet a further aspect, the invention also provides a software product (or "computer program product") when running on a computer which is functionally coupled to or comprised by the target system as defined in any one of the preceding claims, is capable of bringing about the method as described herein.

Essentially any embodiment described above in relation to the control system and the method may thus also apply to the herein described software product.

As indicated above, in an aspect the invention also provides a (control) system configured to execute the method as described herein. Especially, such system is the control system as described herein in more detail.

The target system may be part of or may be applied in e.g. office lighting systems, household application systems, shop lighting systems, home lighting systems, accent lighting systems, theater lighting systems, (outdoor) road lighting systems, urban lighting systems, green house lighting systems, horticulture lighting, etc.

The lighting device may comprise one or more light sources. The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs.

Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The term "light source" may also relate to a plurality of light sources, such as 2-2000 solid state light sources.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
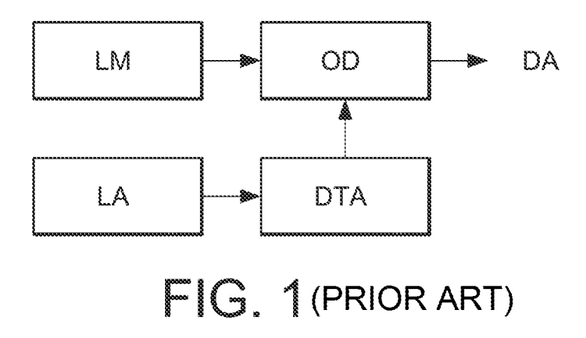
FIG. 1 schematically depicts a possible outlier detection method.

An outlier detection method to determine loads beyond a known installed load is schematically depicted in FIG. 1. The value of the installed (lighting) load is collected from a system audit phase. In FIG. 1, reference LM indicates one or more lighting energy measurements, reference LA indicates a lighting system audit, reference DTA refers to a detection threshold dependent on an audit, and reference OD refers to an outlier detection (or determination). Reference DA refers to a determination action, such as a deviation alarm.

However, a practical problem for larger-scale (lighting) systems is that auditing is not done properly leading to incomplete or inaccurate audit data. Even if audit is done prior to system installation, audit information may change over the (lighting) system lifecycle. As such, it is not straightforward to apply outlier detection due to the difficulty in selection of detection thresholds needed in such methods.

In this invention, we overcome this shortcoming by—amongst others—considering a (lighting) control method and associated processing wherein we estimate possible loads that may have been connected to the lighting system. The detection threshold in the proposed processing does not require any audit and can be easily chosen.

As indicated above, in embodiments a connected lighting system with a controller capable of dimming one or more luminaires, an energy measurement unit capable of measuring energy consumed by the lighting system, a processing unit that processes energy data and outputs excess energy consumption, if applicable, is provided. The following stages may be executed (wherein stages may overlap):

i. The said lighting control system sets the luminaires to at least two dimming levels in a range where the LED luminaire dimming curve is linear, over a duration of the energy measurement period;

ii. Measuring the energy consumption corresponding to the set dimming levels;

iii. Processing method uses the said energy consumption measurements to estimate excess energy consumption of a load connected beyond the lighting load.

Figure 2:
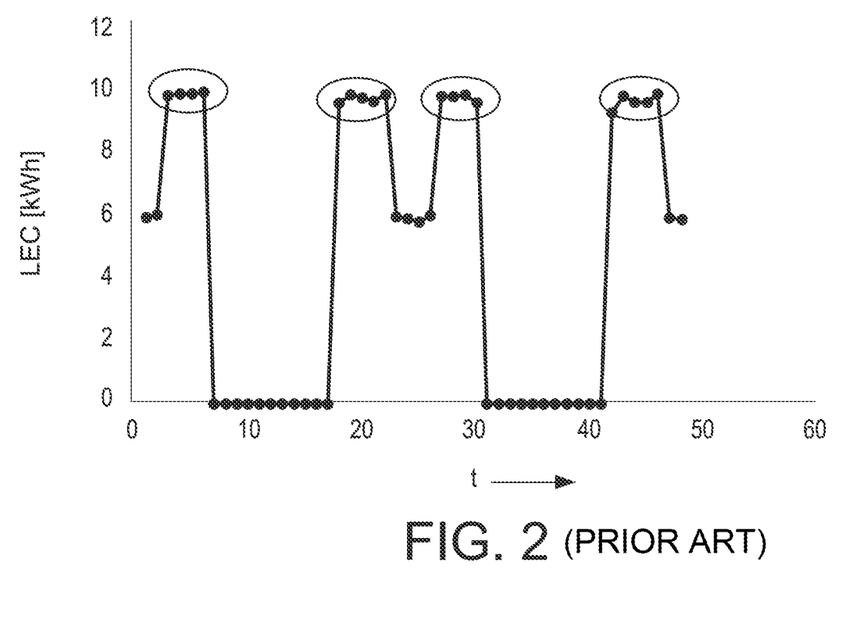
FIG. 2 schematically depicts an example of lighting energy consumption (LEC) of an outdoor lighting system.

We consider a connected lighting system with a controller capable of dimming one or more luminaires. Each controller reports energy consumption over a measurement period (e.g. 15 minutes, an hour) to a processing unit. Let us first consider the method shown in FIG. 1. Let the power consumption of the lighting load when fully ON be denoted by $P_L$ and let an electrical load be connected in the amount $P_E$. In the example shown in FIG. 1, $P_L=6$ kWh, and an excess load of $P_E=4$ kWh is connected in the hours 3-7 am, and 6-11 pm. The measurements are shown as a time series in FIG. 2. Using energy measurements $P_m$, that are typically noisy, we want to determine whether or not an excess energy measurement beyond the lighting load is connected. If an audit has been conducted and is accurate, $P_L$ is known (e.g., $P_L=6$ kWh) and a threshold around this value may be set in an outlier detection method. However, if $P_L$ is unknown or inaccurate, then it becomes difficult to apply outlier detection techniques in a reliable manner. In FIG. 2, we show the hourly lighting energy measurements of a street lighting system. The designed behavior of the system is that the lighting is turned ON at about 6 pm and then subsequently turned OFF at 7 am. From FIG. 2, it is clear that if prior information on the lighting load being about 6 kWh is known, then a detection threshold around that value can be set and it becomes evident that there is considerable excess energy consumption over certain hours in the evening and early morning (highlighted by oval marker showing morning, evening, morning, evening periods over two days) when the lighting system is ON. However, if the lighting load is unknown or its value is not accurately known, then setting a detection threshold is no longer trivial. In FIG. 2, the x-axis is a time axis, e.g. in hours. On the y-axis, LEC refers to lighting energy consumption.

Figure 3:
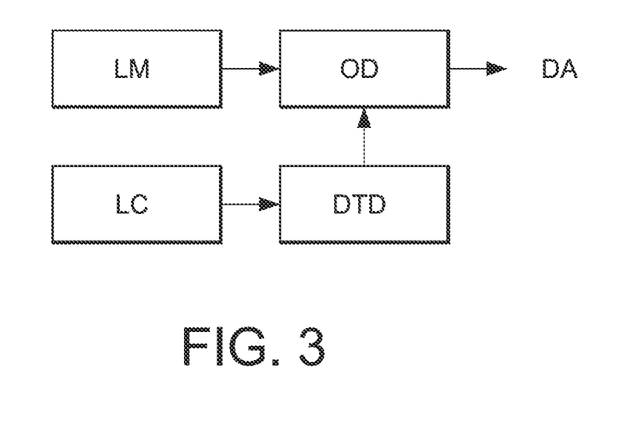
FIG. 3 schematically depicts an embodiment of a proposed lighting control system and associated processing.

In the proposed approach shown in FIG. 3, the controller chooses at least two dimming values where the LED luminaire dimming curve is linear. For example, these values are in the range (0.2, 0.8) where the power consumption of a luminaire is linearly proportional to the dimming level. The dimming is applied over the duration of an energy measurement period. Thus, at dimming level d_i, the power consumption is d_i P_L. Corresponding to this dimming level, let the measurement energy consumption be P_{M,i}.

In FIG. 3, reference LM indicates one or more lighting energy measurements, reference LC indicates a lighting control by dimming to at least two levels on a dimming curve, especially a linear dimming curve, reference DTD refers to a detection threshold determination (as defined herein), and reference OD refers to an outlier detection (or determination). Reference DA refers to a determination action, such as a deviation alarm.

Figure 4A:
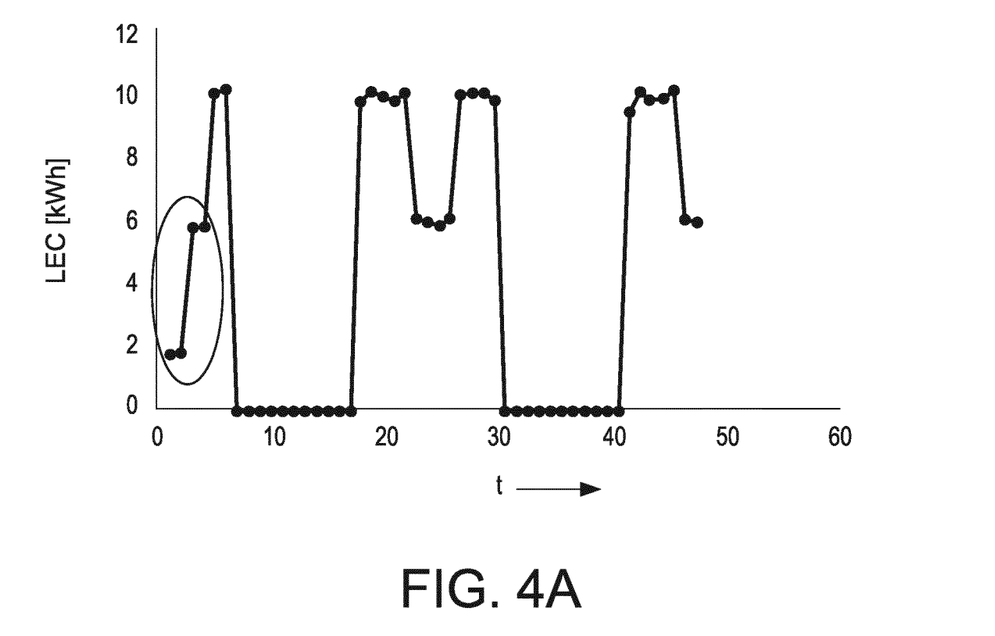
FIGS. 4a-4b schematically depicts an example of lighting energy consumption values upon applied lighting control.
Figure 4B:
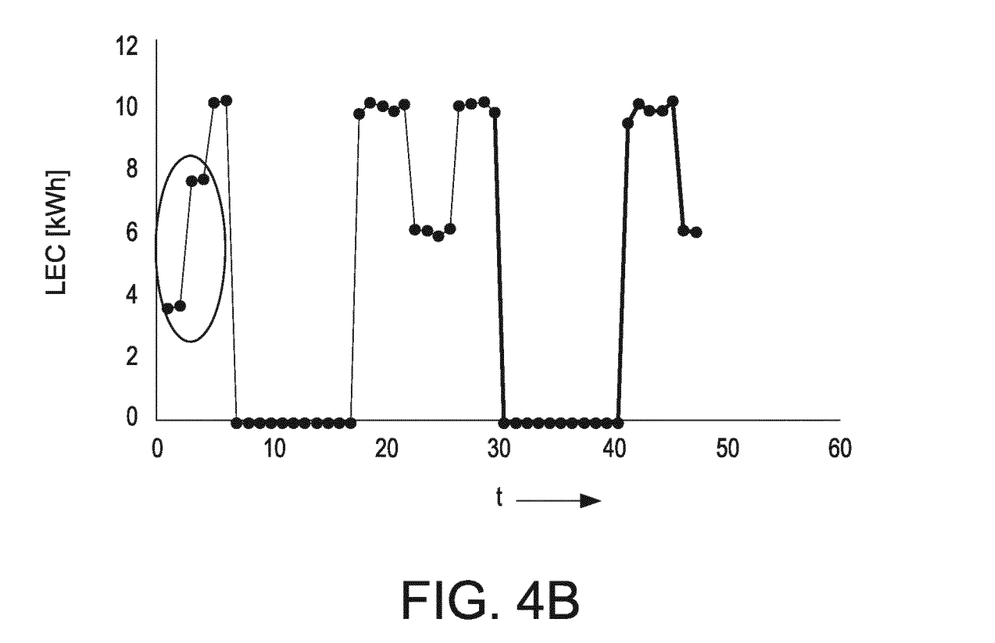

Lighting energy consumption values resulting from applying dimming at levels 0.3 and 0.6 over the first four hours are shown respectively in FIGS. 4 (*a*) and (*b*); the values P_{M,i} are the energy values in these four hours (the first four values represent P_{M,1} in FIG. 4*a* and P_{M,2} in FIG. 4*b* at the two dimming levels 0.3 and 0.6 respectively).

The processing unit performs outlier detection method as follows. Consider the case of two dimming levels. Then the measured energy values and estimated excess load are:

$$d_1 P_L + P_E = P_{\{M,1\}}$$

$$d_2 P_L + P_E = P_{\{M,2\}}$$

$$\widehat{P_E} = \frac{d_2 P_{\{M,1\}} - d_1 P_{\{M,2\}}}{d_2 - d_1}$$

Therefore, N is at least 2. In embodiments, N=2. In other embodiments, N may be chosen up to e.g. 1000, or even larger, or up to 100, like up to 10, such as up to 4.

For better estimation, an average of measurements can be taken to deal with the presence of noisy energy measurements. Also, note that the estimate is independent of the lighting load $P_L$, and a simple detection threshold of 0 (excess load or not) can be set. In practice, a higher value may be set in case a more conservative determination of excess loads is required and to avoid false alarms of excess load. In the example above, the estimated load over the four energy measurement periods is 0, 0.05, 3.96, 4.05 (these values are computed based on the equations above and correspond to the first four hours values are not plotted in any of the figures). Based on these values, it is determined that in the first two hours, there was no external connected load, while in the next two hours there was a connected load of around 4 kWh.

Furthermore, if a load is connected intermittently during the period when the lighting system is ON, then we obtain estimates $\widehat{P_E}$ (k), over each energy measurement sample k, and consider outlier detection on a time series. In this case, for some samples k, the estimation will yield values close to zero (when the load is not connected), and a large non-zero value (when the load is connected).

In FIGS. 4*a* and 4*b*, the x-axis is a time axis, e.g. in hours. On the y-axis, LEC refers to lighting energy consumption.

We note that a combination of the proposed method may be used with the outlier detection method of FIG. 1 for improved estimation, for instance when an initial audit has been conducted accurately (but changes over system lifecycle).

For instance, the invention may be applied for connected street lighting systems. The invention may be applied for energy monitoring.

Figure 5:
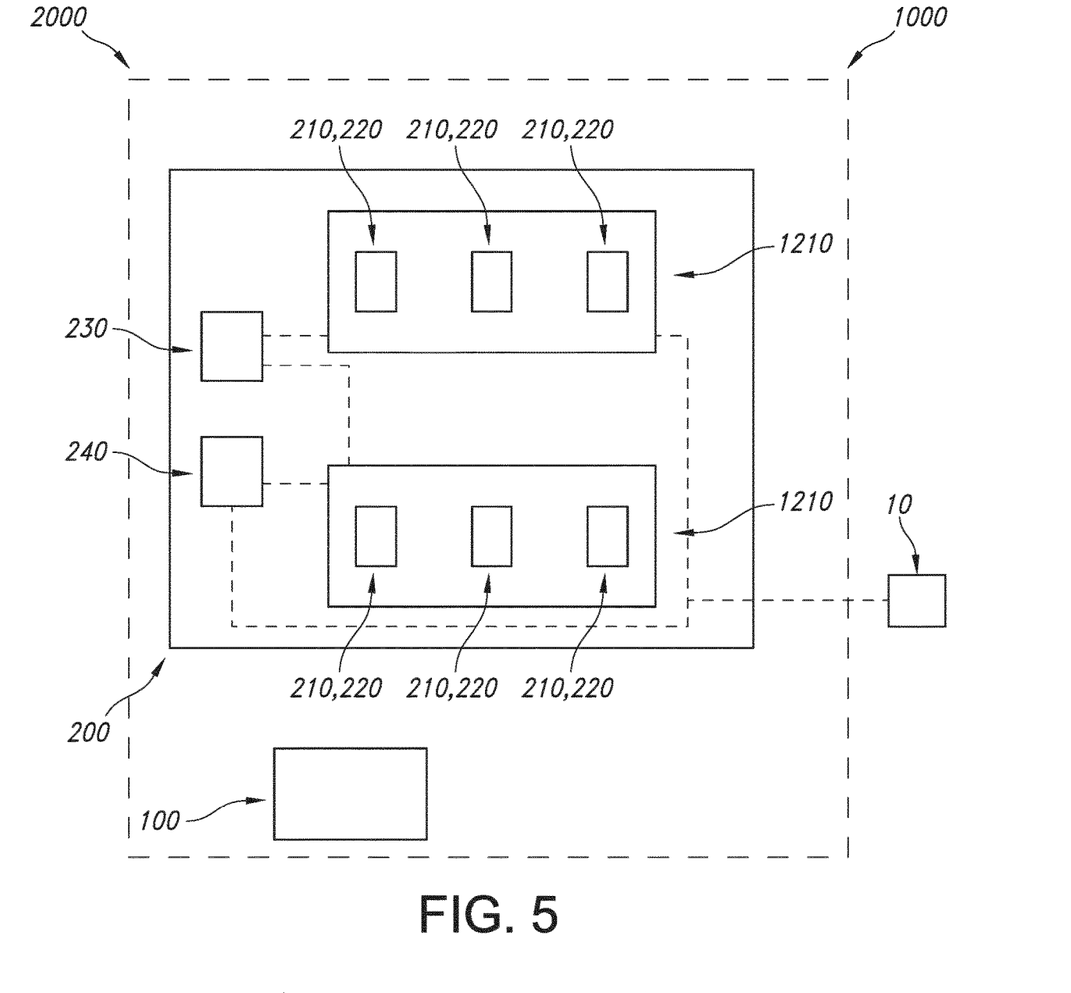
FIG. 5 schematically depicts an embodiment and some aspects of embodiments of the invention.

FIG. 5 schematically depicts an embodiment of a control system 1000. The control system 1000 comprises an electrical power control system 100 for monitoring electrical power consumption by a target system 200. Here, by an embodiment is depicted wherein the target system may be comprised by the control system 1000. However, this is not necessarily the case. The control system may also (temporarily) be functionally coupled to the target system 200.

The target system 200 comprises one or more dimmable electronic devices 210. Here, by way of example each dimmable electronic device 210 comprises a lighting device 220. The one or more dimmable electronic devices 210 are operable at a plurality of different dimming conditions thereby defining a dimming range of the one or more dimmable electronic devices 210 with a predetermined relation between the plurality of different dimming conditions and an electrical power consumption by the one or more dimmable electronic devices 210.

Here, by way of example the target system 200 comprises a plurality of sets 1210 of the one or more dimmable electronic devices 210. For instance, each set may refer to street lighting in a street or in a part of a street. In embodiments, such sets may individually be controlled by the target control system (see below).

The target system 200 further comprises a target control system 230 configured to control the dimming conditions of the one or more dimmable electronic devices 210.

The target system 200 further comprises a source of electrical power 240 configured to provide electrical power to the one or more dimmable electronic devices 210 (to allow the one or more dimmable electronic devices 210 operate at the dimming conditions).

The electrical power control system 100 is configured to execute an electrical power control operation. As indicated above, in embodiments the electrical power control operation may comprise (i) bringing the one or more dimmable electronic devices 210 consecutively at N different dimming conditions, wherein N is at least 2, (ii) sensing the respective electrical power consumptions (from the source of electrical power 240) during the N different dimming conditions, and (iii) determining in a determination stage whether or not a further electronic device 10 having deviating dimming behavior or having no dimming functionality is functionally coupled to the source of electrical power 240 based on a comparison of the sensed electrical power consumptions and the predetermined relation between the plurality of different dimming conditions and the electrical power consumption.

When it is determined that there is such further electronic device, the target system 200 (or part thereof, such as one of the sets 1210) may further be inspected to localize the further electronic device 10, and, if desired, remove such further device 10.

The invention thus also provides a method for monitoring electrical power consumption by a target system 200, wherein the method comprises executing the electrical power control operation as indicated above.

FIG. 5 also schematically depicts thus an embodiment (of the control system 1000 and of the target system 200) comprising a plurality of sets 1210 of the one or more dimmable electronic devices 210. Further, the target system 200 may also comprise one or more of the target control systems 230 configured to control the dimming conditions of the one or more dimmable electronic devices 210 of the plurality of sets 1210. Further, the target system may comprise one or more sources of electrical power 240 configured to provide electrical power to the one or more dimmable electronic devices 210 of the plurality of sets 1210 (to allow the one or more dimmable electronic devices 210 operate at the dimming conditions). The electrical power control system 100 is especially configured to execute the electrical power control operation, wherein the electrical power control operation may in embodiments comprises (i) bringing the one or more dimmable electronic devices 210 of at least one of the plurality of sets 1210 consecutively at N different dimming conditions, wherein N is at least 2, (ii) sensing the respective electrical power consumptions during the N different dimming conditions, and (iii) determining in a determination stage whether or not a further electronic device 10 having deviating dimming behavior or having no dimming functionality is functionally coupled to the one or more sources of electrical power 240 based on a comparison of the sensed electrical power consumptions and (a predicted power consumption based on) the predetermined relation between the plurality of different dimming conditions and the electrical power consumption.

FIG. 5 also schematically depicts an embodiment of a lighting system 2000 comprising the target system 200 and the electrical power control system 100 (for monitoring electrical power consumption by a target system 200), as defined herein.

FIG. 5 also effectively schematically depicts an embodiment of the control system 1000 comprising an electrical power control system for monitoring electrical power consumption by a target system, wherein:

the target system comprises (i) one or more dimmable electronic devices, wherein the one or more dimmable electronic devices are operable at a plurality of different dimming conditions thereby defining a dimming range of the one or more dimmable electronic devices with a predetermined relation between the plurality of different dimming conditions and an electrical power consumption by the one or more dimmable electronic devices, (ii) a target control system configured to control the dimming conditions of the one or more dimmable electronic devices, wherein the target control system is further configured to bring—in an operation mode—the one or more dimmable electronic devices consecutively at N different dimming conditions, wherein N is at least 2, and (iii) a source of electrical power configured to provide electrical power to the one or more dimmable electronic devices;

the electrical power control system is configured to execute an electrical power control operation comprising (i) sensing the respective electrical power consumptions during the N different dimming conditions, and (ii) determining in a determination stage whether or not a further electronic device having deviating dimming behavior or having no dimming functionality is functionally coupled to the source of electrical power based on a comparison of the sensed electrical power consumptions and the predetermined relation between the plurality of different dimming conditions and the electrical power consumption.

Figure 6:
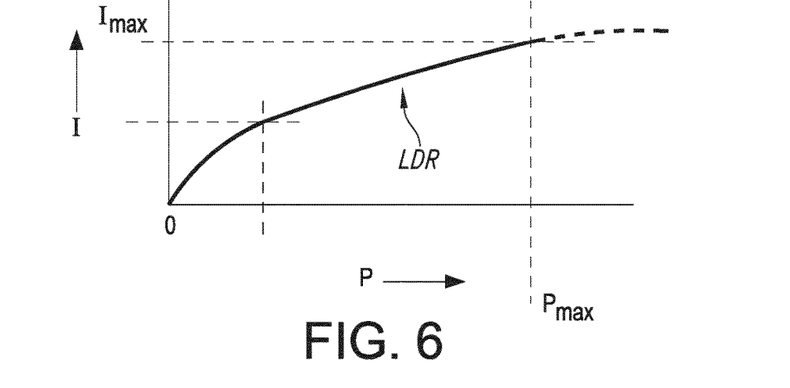
FIG. 6 schematically depicts some aspects of a possible dimming range.

FIG. 6 schematically depicts an example of a dimming range (solid curve), between zero power P=0) and maximum power $P_{max}$. Reference $P_{max}$ may refer to the (maximum) prescribe power. Essentially any electronic device is indicated by a specific power, such as a 60 Watt or 100 Watt lamp, or loudspeaker wattage of 10 Watt. On the y-axis an intensity value I is indicated, like e.g. light flux in the case of lighting or decibel in the case of sound. Part of the dimming range may be linear. This part is indicated with reference LDR (linear dimming range). Each of the different dimming conditions may relate to respective dimming fractions (or: levels), wherein the dimming fractions are linearly related to the electrical power consumption. At maximum (prescribed) power $P_{max}$, the maximum intensity $I_{max}$ may be reached.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting system comprising a target system and a control system, the control system comprising an electrical power control system for monitoring electrical power consumption by the target system, wherein:
the target system comprises one or more dimmable electronic devices, wherein each dimmable electronic device comprises a lighting device, wherein the one or more dimmable electronic devices are operable at a plurality of different dimming conditions thereby defining a dimming range of the one or more dimmable electronic devices with a predetermined relation between the plurality of different dimming conditions and an electrical power consumption by the one or more dimmable electronic devices, a target control system configured to control the dimming conditions of the one or more dimmable electronic devices, and a source of electrical power configured to provide electrical power to the one or more dimmable electronic devices;
the electrical power control system is configured to execute an electrical power control operation comprising bringing the one or more dimmable electronic devices consecutively at N different dimming conditions, wherein N is at least 2, sensing the respective electrical power consumptions during the N different dimming conditions, and determining in a determination stage whether or not a further electronic device having deviating dimming behavior or having no dimming functionality is functionally coupled to the source of electrical power based on a comparison of the sensed electrical power consumptions and the predetermined relation between the plurality of different dimming conditions and the electrical power consumption.

2. The lighting system according to claim 1, wherein each of the one or more dimmable electronic devices has a linear relation between the plurality of different dimming conditions and the electrical power consumption.

3. The lighting system according to claim 1 wherein the electrical power control system is configured to execute the electrical power control operation during a switching on phase or during a switching off phase of the target system.

4. The lighting system according to claim 1, wherein the electrical power control system is configured to sense the electrical power consumption during at least one of the N different dimming conditions during a sensing time, and wherein in the determination stage for the respective dimming condition an, electrical power consumption averaged over the sensing time is applied.

5. The lighting system according to claim 1, wherein the electrical power control system is configured to execute a primary electrical power control operation comprising: operating the one or more dimmable electronic devices at a first operation condition, sensing the electrical power consumption during the first operation condition, and determining in a primary determination stage whether or not a further electronic device having deviating dimming behavior or having no dimming functionality is functionally coupled to the source of electrical power based on a comparison of the electrical power consumption at the first operation condition with a predetermined relation between the first operation condition and the electrical power consumption.

6. The lighting system according to claim 5, wherein the electrical power control system is configured to execute the electrical power control operation only when an outcome of the primary electrical power control operation is the determination that a further electronic device is functionally coupled to the source of electrical power, wherein the control system is configured to execute the electrical power control operation only after the primary electrical power control operation leading to the determination that a further electronic device is functionally coupled to the source of electrical power, and wherein an outcome of the electrical power control operation overrules an outcome of the primary electrical power control operation.

7. The lighting system according to claim 1, wherein the control system comprises the electrical power control system and the target control system.

8. The lighting system according to claim 1, wherein the control system comprises the electrical power control system and the target system.

9. The lighting system according to claim 1, wherein the target system comprises a street lighting system, wherein each dimmable electronic device comprises a street lighting device.

10. The lighting system according to claim 1, wherein the target system comprises an indoor lighting system, wherein each dimmable electronic device comprises an indoor lighting device.

11. The lighting system according to claim 1, wherein the source of electrical power is a plurality of sources of electrical power.

12. A method for monitoring electrical power consumption by a target system, wherein:
the target system comprises one or more dimmable electronic devices, wherein each dimmable electronic device comprises a lighting device, wherein the one or more dimmable electronic devices are operable at a plurality of different dimming conditions thereby defining a dimming range of the one or more dimmable electronic devices with a predetermined relation between the plurality of different dimming conditions and an electrical power consumption by the one or more dimmable electronic devices, a target control system configured to control the dimming conditions of the one or more dimmable electronic devices, and a source of electrical power configured to provide electrical power to the one or more dimmable electronic devices; and
wherein the method comprises:
executing an electrical power control operation comprising bringing the one or more dimmable electronic devices consecutively at N different dimming conditions, wherein N is at least 2, sensing the respective electrical power consumptions during the N different dimming conditions, and determining in a determination stage whether or not a further electronic device having deviating dimming behavior or having no dimming functionality is functionally coupled to the source of electrical power based on the predetermined relation between the plurality of different dimming conditions and the electrical power consumption.

13. The method according to claim 12, comprising executing the electrical power control operation during a switching on phase or during a switching off phase of the target system.

14. The method according to claim 12, comprising sensing the electrical power consumption during at least one of the N different dimming conditions during a sensing time, and wherein in the determination stage for the respective dimming condition an, electrical power consumption averaged over the sensing time is applied.

15. A non-transitory computer readable medium storing instructions that when executed by one or more processors of a computer which is functionally coupled to or comprised by the target system cause the one or more processors to perform the method of claim 12.

\* \* \* \* \*